(12) United States Patent
Macfarlane et al.

(10) Patent No.: US 10,885,795 B2
(45) Date of Patent: Jan. 5, 2021

(54) AIR SPACE MAPS

(71) Applicant: HERE Global B.V., Eindhoven (NL)

(72) Inventors: Jane Macfarlane, Oakland, CA (US);
Jeffrey Adachi, El Cerrito, CA (US);
Aaron Dannenbring, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 80 days.

(21) Appl. No.: 15/933,026

(22) Filed: Mar. 22, 2018

(65) Prior Publication Data
US 2018/0218614 A1 Aug. 2, 2018

Related U.S. Application Data

(63) Continuation of application No. 14/741,039, filed on Jun. 16, 2015, now Pat. No. 9,953,540.

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2019.01) |
| *G08G 5/00* | (2006.01) |
| *G06K 9/00* | (2006.01) |
| *G01C 21/20* | (2006.01) |
| *G05D 1/10* | (2006.01) |

(52) U.S. Cl.
CPC ............ *G08G 5/006* (2013.01); *G01C 21/20* (2013.01); *G05D 1/0011* (2013.01); *G05D 1/106* (2019.05); *G06K 9/00637* (2013.01); *G08G 5/0034* (2013.01); *G08G 5/0069* (2013.01); *B64C 2201/123* (2013.01)

(58) Field of Classification Search
None
See application file for complete search history.

(56) References Cited

U.S. PATENT DOCUMENTS 5,717,593 A * 2/1998 Gvili .................... G05D 1/0083
701/454
7,228,232 B2 6/2007 Bodin et al.
(Continued)

FOREIGN PATENT DOCUMENTS

| CN | 102880186 | 1/2013 |
|---|---|---|
| CN | 103499346 | 1/2014 |

(Continued)

OTHER PUBLICATIONS

Anderson, ETH's sFLY Quadcopters Navigate with Stereo Cameras, Not GPS, May 3, 2012, DIYdrones.com.
(Continued)

*Primary Examiner* — Harry Y Oh
(74) *Attorney, Agent, or Firm* — Lempia Summefield Katz LLC

(57) ABSTRACT

Drone space is defined according to a building model and a buffer space. At least one three-dimensional geometry is identified from the building model. The buffer space is calculated from the three-dimensional geometry. Coordinates for a drone air space are defined based on the buffer space. At least one path segment may be identified based on the coordinates for the drone air space, and the coordinates for drone air space are stored in a map database in association with the at least one path segment.

18 Claims, 12 Drawing Sheets

(56) References Cited

U.S. PATENT DOCUMENTS

| | | | |
|---|---|---|---|
| 7,970,749 | B2 | 6/2011 | Uhlir et al. |
| 8,082,102 | B2* | 12/2011 | Ravenscroft ......... G01C 21/005 701/2 |
| 8,600,602 | B1* | 12/2013 | McAndrew .......... G05D 1/0038 701/23 |
| 8,639,397 | B2 | 1/2014 | Verlut et al. |
| 8,751,156 | B2 | 6/2014 | Musabji et al. |
| 9,087,451 | B1* | 7/2015 | Jarrell .................. G08G 5/0069 |
| 2010/0286859 | A1 | 11/2010 | Feigh et al. |
| 2012/0089274 | A1 | 4/2012 | Lee et al. |
| 2013/0261850 | A1* | 10/2013 | Smith .................. G01C 23/005 701/3 |
| 2014/0018979 | A1 | 1/2014 | Goossen et al. |
| 2015/0131079 | A1* | 5/2015 | Heinonen ............... G01S 17/08 356/4.01 |
| 2016/0117931 | A1* | 4/2016 | Chan .................... G08G 5/0043 701/120 |
| 2016/0202695 | A1* | 7/2016 | Deroos ................ G05D 1/0011 701/2 |
| 2016/0313736 | A1 | 10/2016 | Schultz et al. |
| 2017/0278405 | A1* | 9/2017 | Yakan .................... G08G 5/006 |
| 2018/0026708 | A1* | 1/2018 | Priest ...................... H04W 4/40 370/316 |
| 2018/0174448 | A1* | 6/2018 | Gomez Gutierrez .... G08G 1/08 |
| 2019/0129039 | A1* | 5/2019 | Schubert ............... G01S 17/933 |

FOREIGN PATENT DOCUMENTS

| | | |
|---|---|---|
| WO | 2014112908 | 7/2014 |
| WO | 2015102886 | 7/2015 |

OTHER PUBLICATIONS

Betsy Mason, Have a Drone? Check this Map Before you Fly It, Jul. 23, 2014, wired.com.
Curtis, Path Planning for Unmanned Air and Ground Vehicles in Urban Environments, Apr. 2008, Bringhan Young University.
David Axe, New Use for your iPhone: Controlling Drones, Aug. 7, 2009, wired.com.
Deborah M. Todd, Companies Increasingly Turning to Tech to Keep Drones out of No-Fly Zones, Feb. 10, 2015, Pittsburgh Post Gazette.
iPhone Being Used to Control Unmaned Aerial Vehicles (UAVs), Jun. 17, 2008, iphonehacks.com.
Jun et al., Path Planning for Unmanned Aerial Vehicles in Uncertain and Adversarial Environments, In the book Chapter of "Cooperative Control Models, Applications and Algorithms", 2003, Springer US.
Martyn Williams, New Database Promises Drone No-Fly Zone Around your House, Feb. 10, 2015, PCworld.com.
Sebastian Scherer et al., Flying Fast and Low Among Obstacles, 2007, IEEE International Conference on IEEE.
Stephan Weiss et al., Intuitive 3D Maps for MAV Terrain Exploration and Obstacle Avoidance, 2011, Journal of Intelligent & Robotic Systems.
Terdiman, Drones Navigate Best by Seeing, Stealth Software Startup Says, Jan. 15, 2015, venturebeat.com.
Tsourdos et al., "Cooperative Path Planning of Unmanned Aerial Vehicles", The Road Map Method, p. 13, secion 1.5, Nov. 9, 2010, Wiley Publishers.
UAV Planner, accessed May 1, 2015, orbitlogic.com.
You, Drones Could 3D-Map Scores of Hectares of Land in Just a Few Hours, Oct. 28, 2014, news.sciencemag.org.

* cited by examiner

AIR SPACE MAPS

This application is a continuation under 35 U.S.C. § 120 and 37 C.F.R. § 1.53(b) of U.S. patent application Ser. No. 14/741,039, filed Jun. 16, 2015, the disclosure of which is incorporated herein by reference in its entirety.

FIELD

The following disclosure relates to air space maps for unmanned aerial vehicles or drones.

BACKGROUND

An unmanned aerial vehicle (UAV) or unpiloted vehicle may be referred to as a drone. The term may be inspired by the male honeybee by the same name that often travels in numbers and is agile in flight. In some instances, the larger fixed wing vehicles common in military applications may be referred to as unmanned aerial vehicles and the smaller commercial or private use vehicles, which may operate autonomously or be remotely controlled by a nearby user may be referred to as drones.

The copter class of UAVs or drones may include any number of spinning blades that create lift by forcing air downward or in other directions. Initial uses of UAVs included surveillance and aerial photography. Recent efforts have expanded into many other fields including surveying, package delivery, robot waiters, and other applications. Many UAVs are remotely controlled by human operators. Challenges remain in automatic routing of UAVs.

SUMMARY

In one embodiment, at least one three-dimensional geometry is identified from a building model. A processor calculates a buffer space from the at least one three-dimensional geometry and defines coordinates for a drone air space based on the buffer space. At least one path segment corresponding to the coordinates for the drone air space is identified and storing the coordinates for drone air space are stored in association with the at least one path segment in a map database.

In one embodiment, an embodiment includes detecting a position of a drone vehicle, sending a routing request for the drone vehicle and the position of the drone vehicle, and receiving a navigation command based on the routing request, wherein the navigation command is based on a drone air space defined by at least one three-dimensional geometry from a building model and a buffer space generated from the building model.

In one embodiment, an apparatus is configured to perform identifying at least one three-dimensional geometry from a building model; calculating a buffer space from the at least one three-dimensional geometry; defining coordinates for a drone air space based on the buffer space; and storing the coordinates for drone air space.

BRIEF DESCRIPTION OF THE DRAWINGS

Exemplary embodiments of the present invention are described herein with reference to the following drawings.

DETAILED DESCRIPTION

A geographic database or map database may include path links or segments that correspond to pathways on the ground or elevated from the ground (e.g., ramps or bridges). The pathways may be pedestrian walkways, highways, streets, or other roads. The path segments may also include drone-specific path segments that do not follow a ground path. The following embodiments describe incorporation of the geographic database with navigable drone space definitions. The navigable drone space is a three-dimensional area that UAVs or drones are permitted to fly. The navigable drone space may be the negative or inverted space of the three-dimensional objects stored in the geographic database. In other words, a building model or object model that defines the three dimensional locations and spatial makeup of buildings and/or other objects may be inverted such that the spaces outside of the model are defined as the navigable drone space. The navigable drone space may be further limited by a buffer space between the buildings or objects and the navigable drone space.

Figure 1:
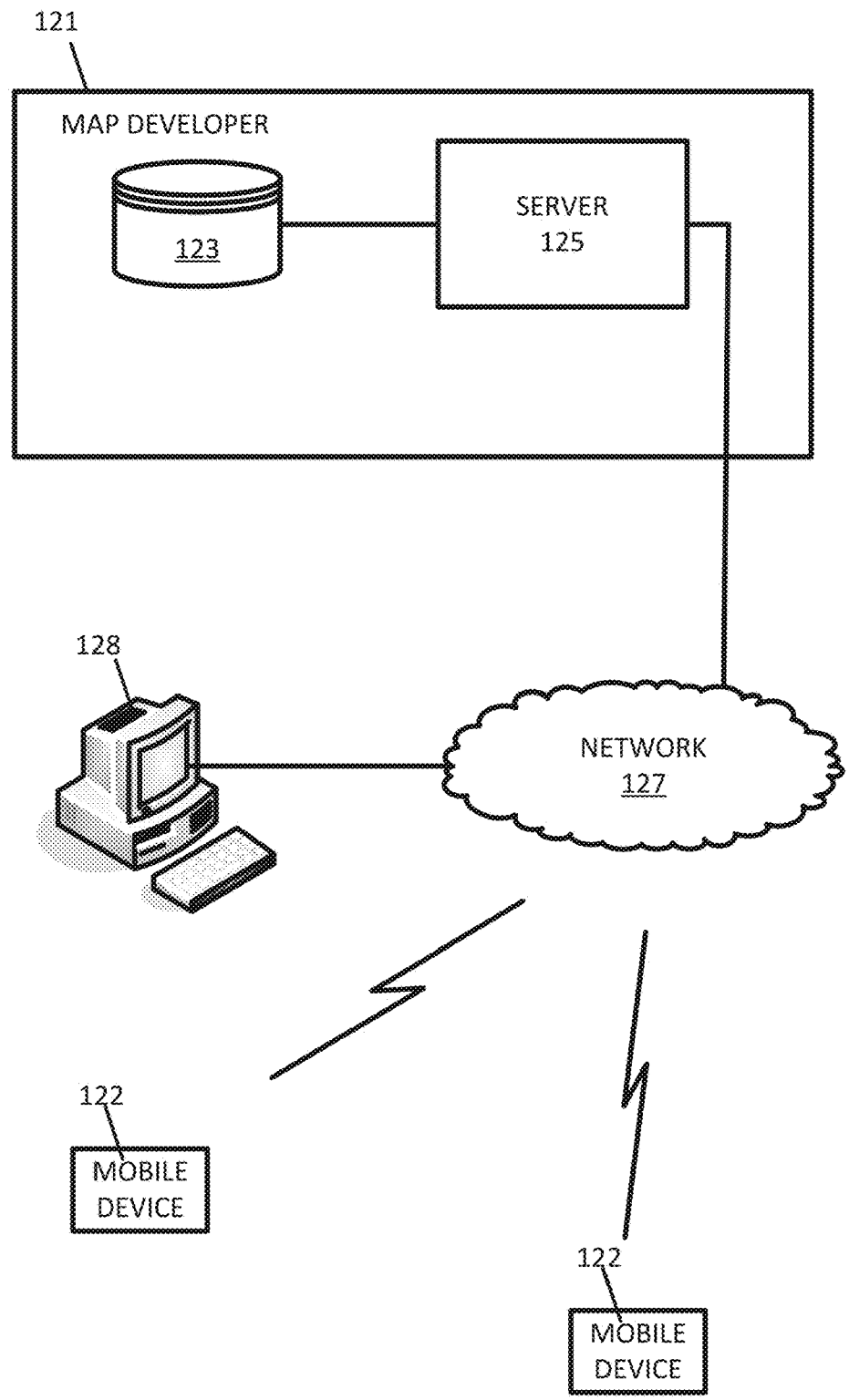
FIG. 1 illustrates an example system for defining a drone navigable space.

FIG. 1 illustrates an example system for defining a drone navigable space. The system 120 includes a developer system 121, one or more mobile devices 122 (navigation devices), a workstation 128, and a network 127. The mobile devices 122 may be carried by vehicles, users or pedestrians, or the mobile device 122 may be integrated in drones. Additional, different, or fewer components may be provided. For example, many mobile devices 122 and/or workstations 128 connect with the network 127. The developer system 121 includes a server 125 and one or more databases. The term database and map database refers to a set of data or map data stored in a storage medium and may not necessarily reflect specific any requirements as to the relational organization of the data or the map data. The database 123 may be a geographic database including road segments, building models and/or externally supplied airspace restrictions.

The map data may include a network of path segments. The path segments may represent pedestrian pathways, roads or other streets. The path segments may be defined by a starting point and an ending point, each defined by two coordinates (e.g., latitude and longitude) or three coordinates (e.g., latitude, longitude, and altitude). Curved paths may be represented by a sequence of shorter path segments or by 2D or 3D splines. The splines may be defined by polynomial functions and may be piecewise. The path segments may connect at nodes, which represent intersections.

Figure 2:
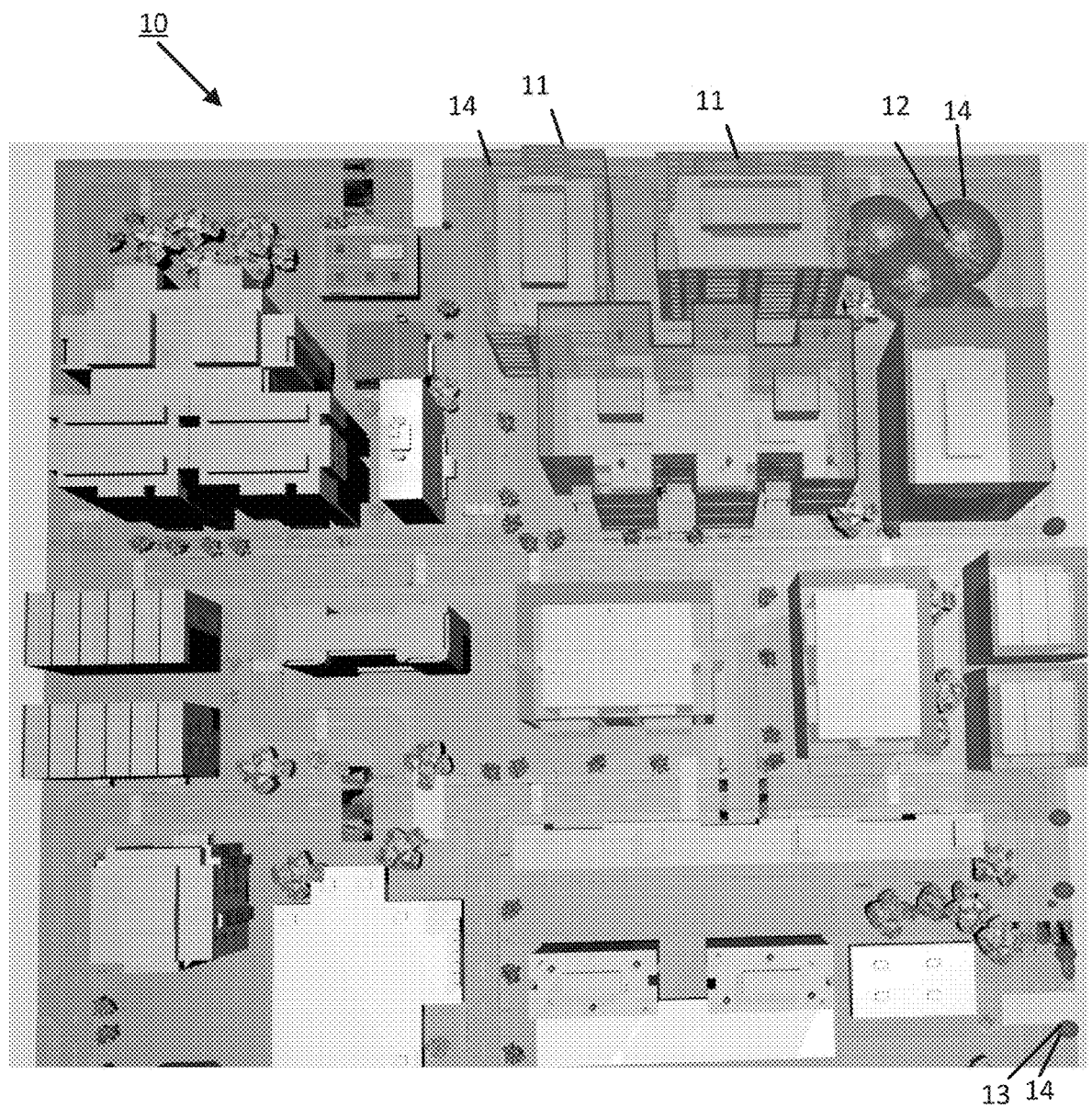
FIG. 2 illustrates an example top down view of a building model including drone buffers.

FIG. 2 illustrates a building model 10. The building model 10 may be a three-dimensional building model or a two-dimensional building model. The two-dimensional building model may include building footprints defined by three or more geographic coordinates. The three-dimensional building model may include three-dimensional geometric shapes or geometries defined by three or more three-dimensional coordinates in space.

The building model may be measured using a range finding device (e.g., a light detection and ranging (LIDAR) sensor) mounted on a stationary tripod, a ground vehicle or an aerial vehicle. As the vehicle travels along pathways corresponding to path segments in the map data, the range finding device collects distance data, which may be spatially arranged as a point cloud. The point cloud may be analyzed to identify the buildings or objects in the model. In one alternative, the building model may be created through measuring the locations of buildings manually. The building model may be overlaid on the map data and stored in a map database. Buildings or other objects adjacent to path segments may be indexed according to those path segments.

In addition or in the alternative to link-node or segment-node maps, the map data may include a three-dimensional surface representation of a road network. The three-dimensional surface representation may include the dimensions of each lane of the road and may be represented in computer graphics. Another example for the map data includes a high density (HD) or high resolution map that provides lane-level detail for automated driving. The HD Map enables vehicles to be precisely positioned on the road within an accuracy of 10 to 20 centimeters. In addition to the link-node application, any of the examples herein may be applied to three-dimensional surface representations, HD maps, or other types of map data.

Figure 3:
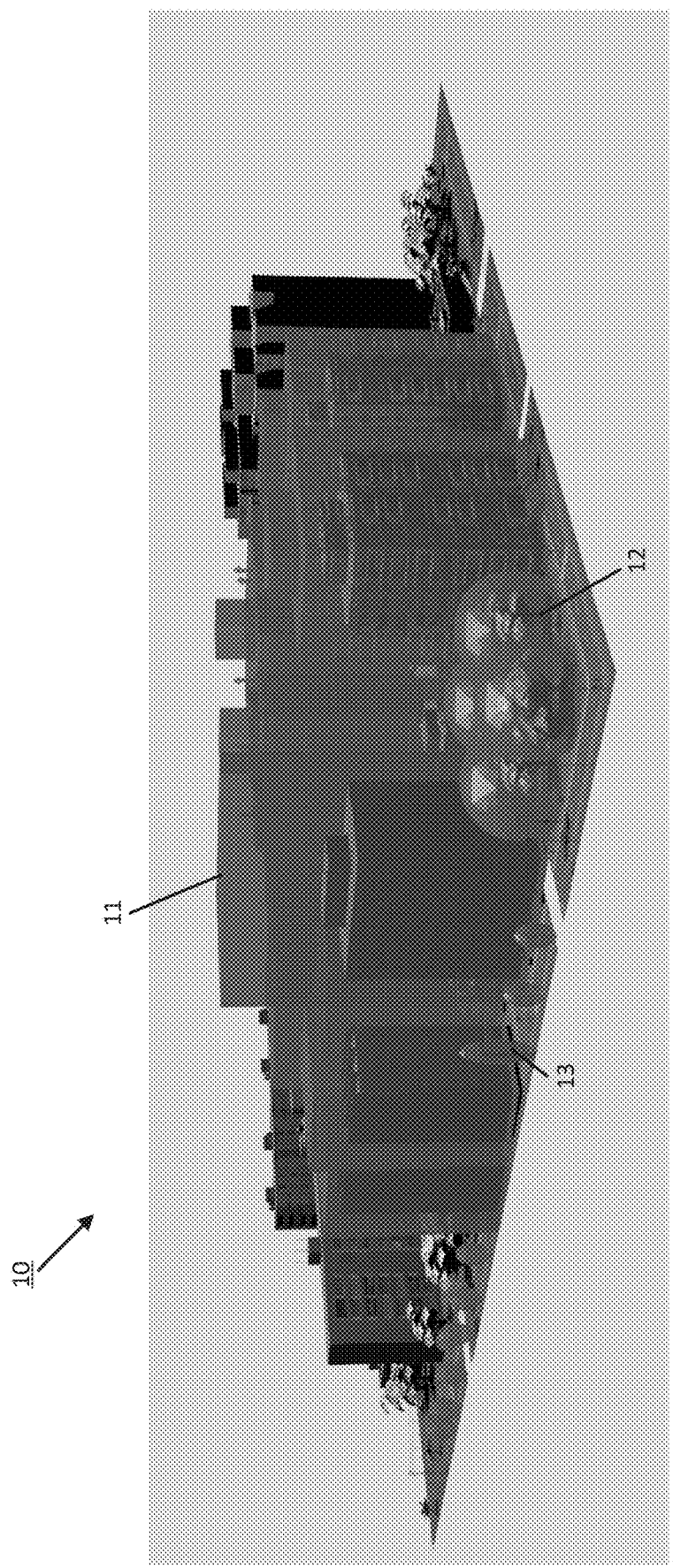
FIG. 3 illustrates an example perspective view of the building model including drone buffers.

The server 125 may calculate a drone navigable space based on the building model. The server 125 may identify at least one of the three-dimensional geometries from a building model stored in database 123. The three-dimensional geometries may correspond to buildings 11, trees or other vegetation 12, or smaller objects 13 such as road signs, stop lights, barricades, street lights, billboards, patios, antennas, or the like. FIG. 3 illustrates an example perspective view of the building model including drone buffers.

The server 125 may calculate a buffer space from the building model. The buffer space may be a three-dimensional extension of the building model. In one example, the buffer space is defined by a predetermined buffer distance around objects and buildings in the building model or the point cloud. Example distances for a width of the buffer space may include one foot, one meter, ten feet, ten meters, or another distance. In another example, the buffer space may be variable. The buffer space may depend on the type of object in the building model (e.g., a high buffer space may be applied to buildings and a small buffer space may be applied to trees and other objects). The buffer space may depend on the geographic area, the type of pathway, or another characteristic of the local area of the buffer space, which are described in additional embodiments herein.

The server 125 may define coordinates for a drone air space based on the buffer space. The drone air space may be the space remaining in the world or a local geographic space after removing the building model and the buffer space. In other words, the drone air space may be the inverse of a combination of the building model and the buffer space. The drone air space may be a negative of a combination of the building model and the buffer space. For example, for each single point having a latitude, longitude, and a height, the single point may be either part of the drone air space or part of the combination of the building model and the buffer space.

The coordinates describe the geographic bounds of the drone air space. For example, the server 125 may identify at least one path segment based on the coordinates for the drone air space. The server 125 may associate portions of the drone air space with the closest path segments. In some examples, the drone air space is also stored according to path segments. For example, each road segment includes one or more attributes that define the height and width of the drone air space at locations along the path segments. The server 125 may store the coordinates for drone air space in association with the at least one path segment in the database 123.

The server 125 or the mobile device 122 may generate flight commands to navigate a drone with the drone air space. The commands may include directional commands in six degrees of freedom (e.g., clockwise or counterclockwise in yaw, pitch and/or roll). The directional commands may be created based on the geographic bounds of the drone air space. The server 125 or the mobile device 122 controls the drone within the drone air space. In other words, the directional commands control the drone to fly around the buffer space.

In one example, the server 125 or the mobile device 122 routes the drone through the drone air space, and outside of the buffer space, based on the dimensions of the drone air space. In another example, the routes are calculated based on path segments associated with portions of the drone air space and the height or width of the flight path is determined based on the drone air space. Example routing techniques include the A* algorithm and the Dykstra algorithm. In other words, the server 125 may calculate a route based on the path network in the map data of the database 123, and the flight of the drones along that route may follow the path network but be limited by the drone air space in the horizontal and vertical direction along the route within the path network.

In another example, the drone may be controlled by radio or other wireless signals received by the mobile device 122. The path of the drone is limited by the drone air space that is pre-loaded in the mobile device 122 or transmitted to the mobile device 122. For example, a user may control the drone with a remote control. However, the path of the drone is limited based on the dimensions of the drone air space. The server 125 or the mobile device 122 may monitor the flight of the drone an issue a warning if the drone attempts to enter the buffer space or comes within a predetermined distance to the buffer space.

Figure 4:
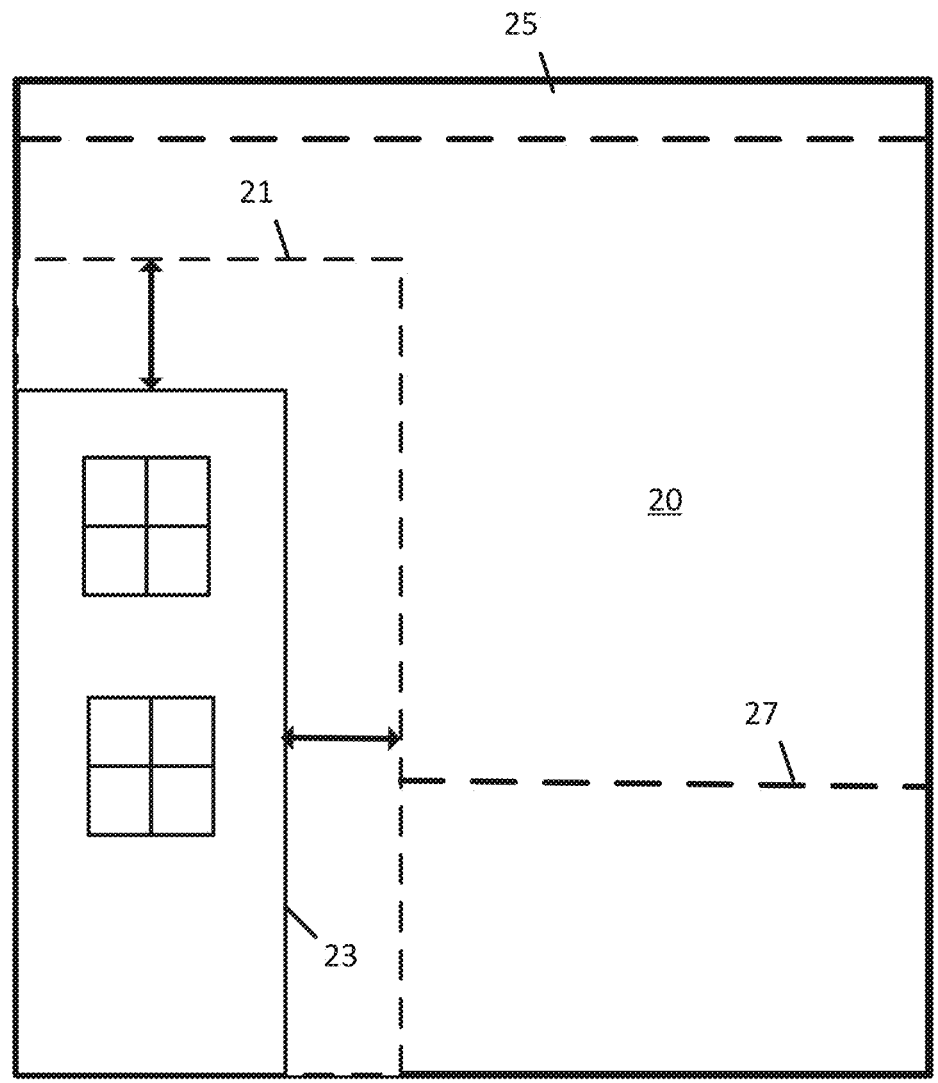
FIG. 4 illustrates an example cross section of a drone navigable space.

FIG. 4 illustrates an example cross section of a drone navigable space 20. The drone navigable space 20 may be defined according to a building model 23, a buffer space 21, a flight space 25, and a path space 27. In other words, the buffer space 21, the flight space 25, and the path space 27 may define the boundaries of the drone navigable space 20. Additional, different or fewer spaces may be provided.

The flight space 25 may be the air space designated for aircraft. For example, the Federal Aeronautical Administration (FAA) may define various classes of air space (e.g., classes A through E). Each class may define various rules or regulations that are applied to elevation ranges and/or distances ranges from airports. The summations of the air space classes may be referred to as a controlled air space, which is illustrated by flight space 25.

The lowest height or altitude of the flight space 25 defines a maximum height or altitude limit for the drone navigable space 20. The maximum height for the drone navigable space 20 may be measured from the surface of the Earth or from the mean surface of the Earth. Examples for the maximum height based on FAA regulations may be from 700 to 1200 feet from the surface of the Earth. Similar distances may be measured from the mean seal level, which is the average level for the surfaces of the Earth's oceans. Mean sea level may be calculated as a level surface of an Earth gravitational potential model such as EGM96. The model may apply the principle of average sea level to regions far from the coast. The altitudes may be specified relative to an ellipsoid model of the Earth, such as the WGS84 standard used by GPS. Standard conversion between coordinate systems exist, so even if different regulatory bodies (e.g. FAA, local governments) use different standards, the drone navigable space map can be defined, stored or published in whichever coordinate system is desired. Other examples for the maximum height for the drone navigable space 20 may include 50 feet, 50 meters, 100 feet, 100 meters, or other values. The server 125 may calculate the location of the flight space 25 and, accordingly, a size of the drone navigable space 20 based on the flight space 25.

The maximum height for the drone navigable space may vary depending on a geographic area. For example, urban areas with tall buildings may push the maximum height for the drone navigable space 20 higher, which may also correspond to a higher controlled air space in areas with tall buildings. Less congested areas may have a lower maximum height for the drone navigable space 20.

The maximum height for the drone navigable space 20 may vary depending on the time of day. For example, the controlled airspace may have a higher lower limit at night to reduce noise from air traffic. Accordingly, the maximum height for the drone navigable space 20 may be higher than during the day in order to reduce noise or because there is more availability because of the higher controlled air space. The maximum height for the drone navigable space 20 may vary depending on weather. For example, during wind, storms, or rain, the maximum height for the drone navigable space 20 may be reduced to protect the drones from the weather. The maximum height for the drone navigable space 20 may vary depending on drone traffic. For example, when drone traffic increases, the drone navigable space 20 may be expanded, and accordingly, the maximum height for the drone navigable space 20 may be increased. The server 125 may calculate the maximum height and, accordingly, a size of the drone navigable space 20 based on one or more of the time of day, the weather, or drone traffic.

The path space 27 or ground traffic space may be a space designated for the traveler of the path segment. For example, depending on the type of path segment, pedestrians, vehicles, or trains, may travel along the path segment. A height of the path space 27 may be different from path segment to path segment as a function of the type of traveler. Path segments for trains may have a high height for the path space 27, path segments for motor vehicles may have a medium height for the path space 27, and path segments for pedestrians may have a low height for the path space 27. The server 125 may calculate the location of the path space 27 and, accordingly, a size of the drone navigable space 20 based on the path space 27.

The path space 27 also may have a specified width based on the type of path segment. In one example, the width of the path space 27 depends on the number of lanes of the path segment. More lanes (e.g., lanes of vehicular travel, train tracks, or pedestrian walkways) correspond to wide path spaces 27. In another example, the width of the path space 27 may be depend on a functional class of the path segments. Higher functional classifications may correspond to wider path spaces 27. Example functional classification systems are described below. The server 125 may select a current path segments based on a location of a drone or based on a systemic construction of the drone navigable space 20. The server 125 may identify a functional classification for the path segment from database 123. The server 125 may select the buffer space according to functional classification.

The buffer space 21, and accordingly, the drone navigable space 20, may be sized according to one or more variables. The variables may include geographic region, temporal characteristic, or the drone itself.

In one embodiment, the buffer space 21 may be a function of geographic region. The buffer space 21 may be larger in some areas and smaller in others. For example, urban areas may have a smaller buffer space, which may be out of necessity (i.e., less space available), and rural areas may have a larger buffer space. In other examples, local municipalities may designate the dimensions of the buffer space 21. Thus, server 125 may identify a geographic region based on a location of a drone or a selected path segment. Then, the server 125 may identify a local rule for the buffer space 21 that is associated with the geographic region. Finally, the server 125 may calculate a size for the navigable drone space 20 based on the buffer space 21, which depends on the geographic region.

In one embodiment, the buffer space 21 may be a function of a temporal characteristic such as time of day, day of week, or day of year. For example, the buffer space 21 may be a first size at night and a second size during the day. The night size of the buffer space 21 may be larger in order to reduce the noise experienced in houses or apartment buildings. The night size of the buffer space 21 may be smaller because there are fewer obstacles to avoid at night. In another example, the buffer space 21 may be a larger size at certain times of the day (e.g., during rush hour, during feeding times of birds, or other times). The server 125 is configured to identify a temporal characteristic (e.g., time, day of week, or day of year) and select the buffer space 21 according to temporal characteristic.

In one embodiment, the buffer space 21 may be a function of the drone itself. For example, the server 125 may receive a request from one of the mobile device 122 associated with (e.g., integrated in or carried by) a drone. The request may include a drone identification value. The drone identification value may identify a model of the drone, an owner of the drone, or capabilities of the drone. The server 125 or the mobile device 122 may define the buffer space 21 for the drone based on the drone identification value.

In one example, the server 125 or the mobile device 122 includes a lookup table that associated drone models or identification values with dimensions or speeds that define an appropriate size of the buffer space 21. In another example, the server 125 or the mobile device 122 includes a lookup table that associated drone models or identification values with an owner and appropriate sized of the buffer space 21. For example, government drones may have one buffer space size, authorized package service drones may have another buffer space size, and personal use drones may have a third buffer space size.

In another embodiment, the server 125 or the mobile device 122 includes a lookup table that associated drone models or identification values with a degree of error based on the drone's capabilities. The capabilities of a drone may be a function of the position circuitry (e.g., a version of global positioning system firmware or a degree of error of an inertial measurement unit), a response time of the flight system of the drone, a steering radius of the flight system of the drone, or a characteristic of a communication system with the drone (e.g., latency of radio communication, or bandwidth of radio communication). The server 125 or the mobile device 122 is configured to determine a degree of error for a drone based on the drone identification value and select the buffer space 21, and accordingly, the navigable drone space 20, according to the degree of error for the drone.

Figure 5:
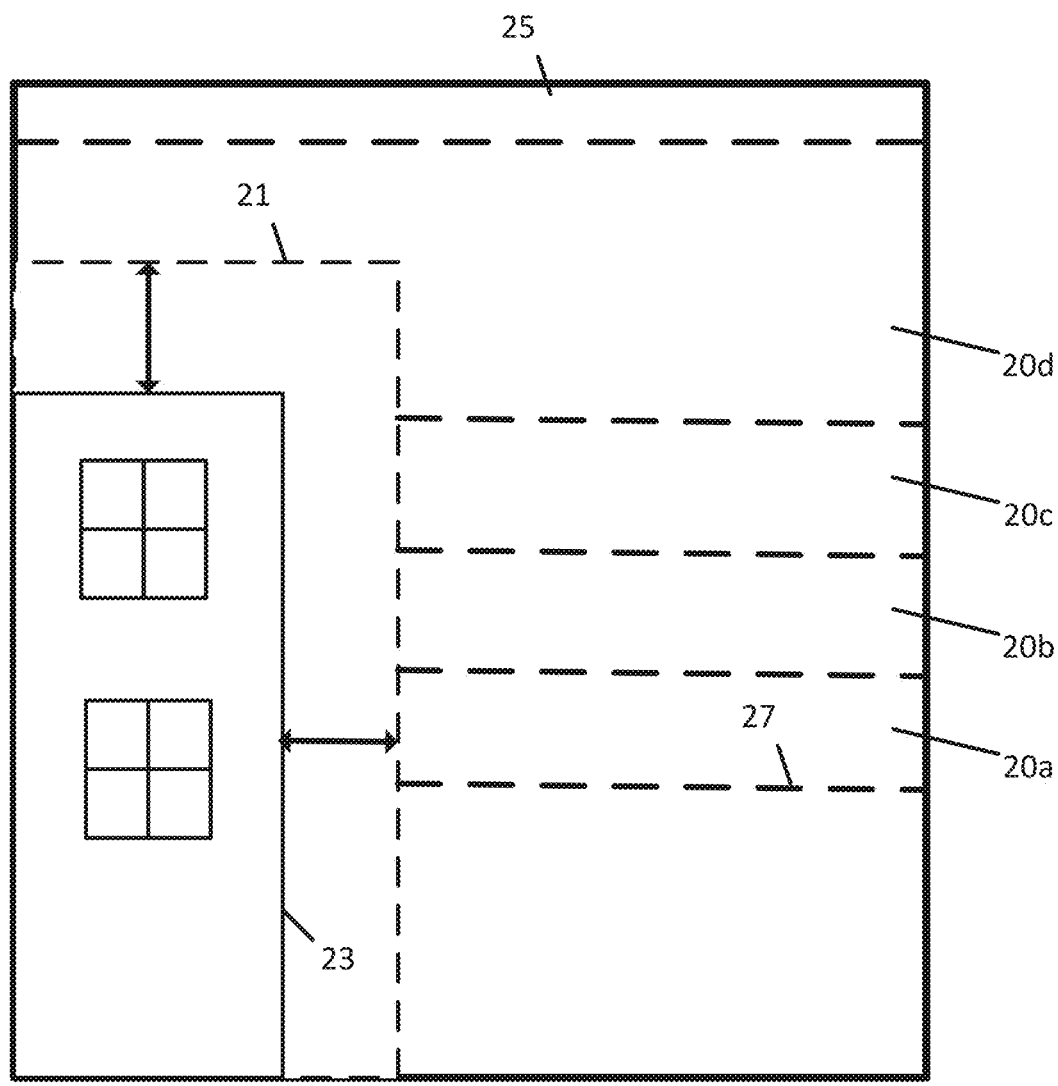
FIG. 5 illustrates another example cross section of a drone navigable space.
Figure 6:
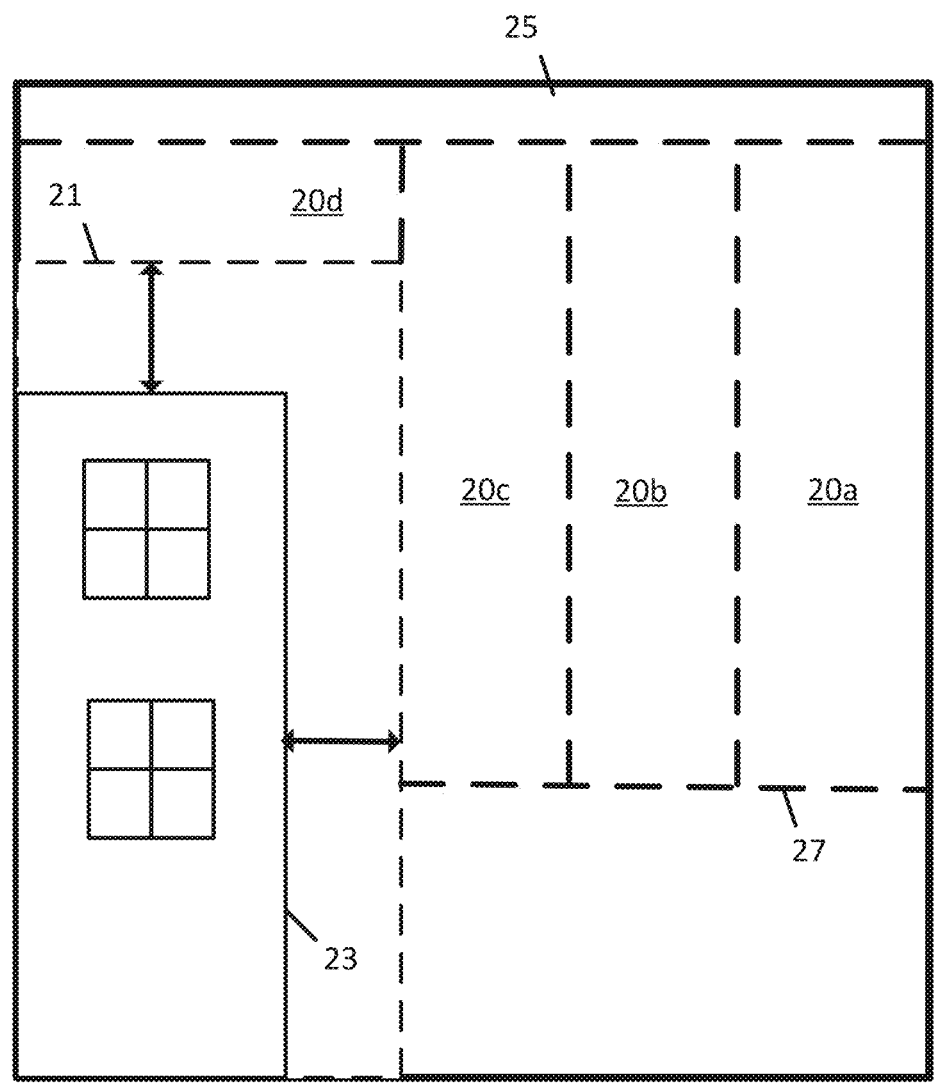
FIG. 6 illustrates another example cross section of a drone navigable space.

FIG. 5 illustrates another example cross section of a drone navigable space. The done navigable space may also be defined by one or more of the buffer space 21, the path space 27, and the controlled air space 25. The drone navigable space of FIG. 5 may include multiple vertical levels or lanes 20*a-d* arranged vertically in space. Any number of lanes may be used (e.g., two, three, or more than four lanes). Each of the lanes 20*a-d* may correspond to a different class of drones. FIG. 6 illustrates another example cross section of another drone navigable space. The drone navigable space of FIG. 6 may include multiple horizontal levels or lanes 20*a-d* arranged horizontal in space. One or more of the horizontal levels (e.g., lane 20*d*) may also be arranged vertically compared to one or more of the other horizontal levels. The following descriptions may be applied to either horizontal levels, vertical levels, or both.

Each of the lanes 20*a-d* may correspond to a different speed of the drones. For example, drones in a first speed range may be directed to lane 20*a*, drones in a second speed range may be directed to lane 20*b*, and so on. Example speed ranges may include 0-10 miles per hour (mph), 11-20 mph, and 21-30 mph. Other ranges and units may be used. The server 125 may select a route for a drone based on a requested speed.

One or more of the lanes 20*a-d* may correspond to a different direction of travel of the drones. For example, north bound traffic may be directed to lane 20*a* and south bound traffic may be directed to lane 20*b*. Other directions are possible. In some open spaces, the lanes 20*a-d* may correspond to three or more directions across the open spaces. Each of the lanes 20*a-d* may correspond to a different type of drone. For example, fixed wing drones may be directed to lane 20*d* and copter drones may be directed into lanes 20*a-c*. Each of the lanes 20*a-d* may be shaped according to a different size for the buffer space 21. For example, lane 20*d* may be associated with a large buffer space 21 and lane 20*a* may be associated with small buffer space 21. Additional buffer space sizes may be associated with any combination of lane 20*a-d*.

Various techniques may be used in arranging or sizing the vertical levels 20*a-d*. The server 125 may determine the sizes of the levels 20*a-d* or fewer levels based on monitoring flights of the drones. The sizes may be changed as a function of traffic in the respective levels 20*a-d*. The sizes of the levels 20*a-d* may be changed according to routes determined by the server 125. For example, multiple mobile devices 122 associated with drones may send routing request to the server 125. Thus, the server 125 may designate a level to a portion of those routes and regulate traffic flows through the levels 20*a-d* based on the routing requests. The sizes of the lanes 20*a-d* may be changed according to local laws or regulations. The sizes of the lanes 20*a-d* may be changed according to capabilities of the drones or based on types of the drones.

The server 125 may also assign one or more ramps between the lanes 20*a-d*. The ramps are navigable paths between the lanes 20*a-d*. The server 125 may route a drone from lane 20*a* to lane 20*b* through a designate ramp. The ramp may be a three-dimensional path or particular two-dimensional geographic area where flight between lanes is permitted. The server 125 may also define ramps between any of the lanes 20*a-d* and a rooftop of a building in the building model, or between any of the lanes 20*a-d* and the ground.

Figure 7:
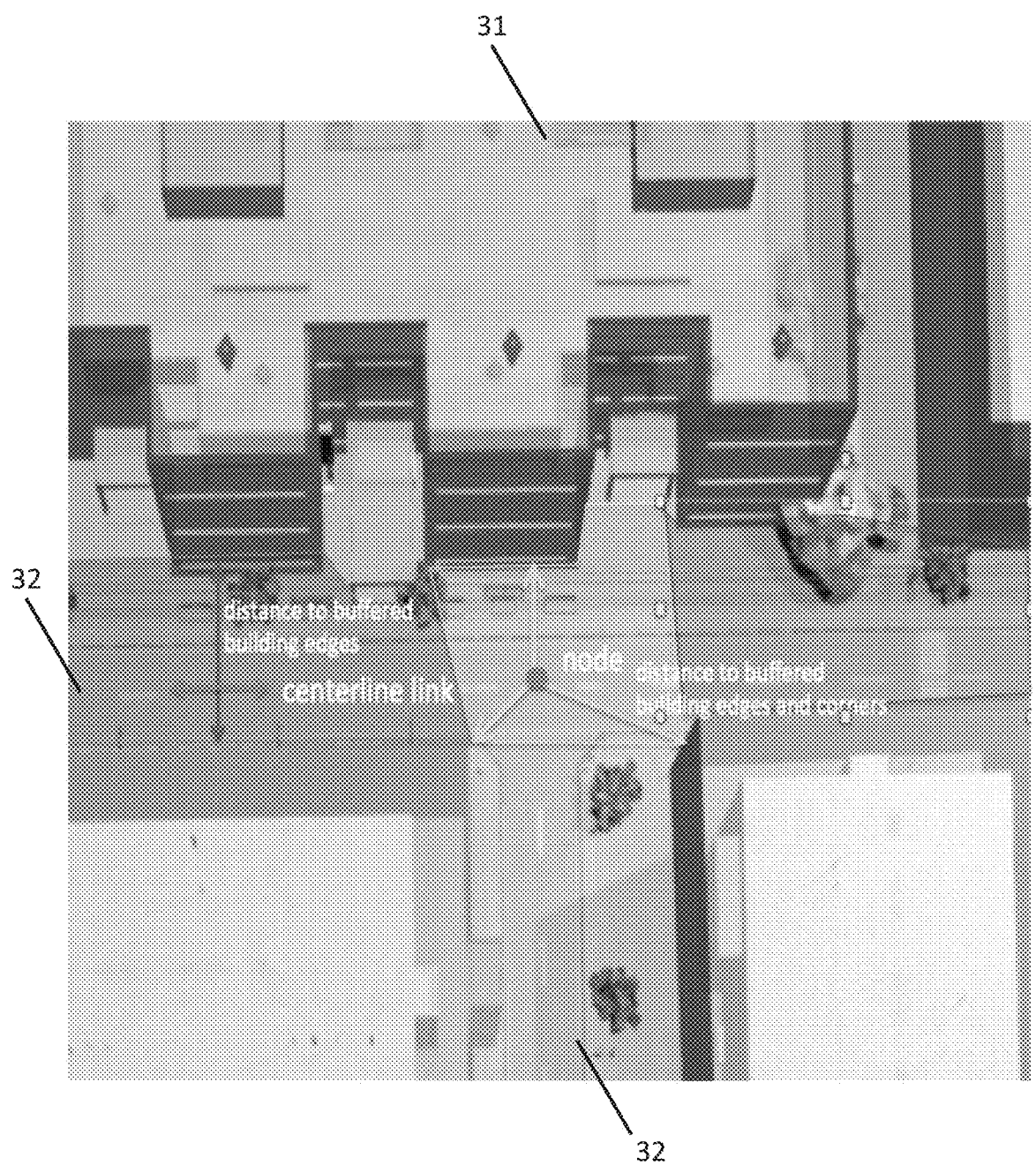
FIG. 7 illustrates an example drone navigable space tied to one or more path segments.

FIG. 7 illustrates an example drone navigable space tied to one or more path segments 32 and limited by buffer space 31. The navigable space for the drones may extend from origins and destinations along the path segments 32 (e.g., stored in database 123) and be defined based on the drone navigable space 20 along those path segments. The server 125 may generate drone maps by combining the path segment network and the drone navigable space. The drone navigable space may follow a centerline of the path segments. The buffer space 21 may be defined at a predetermined distance to the center lines of the path segments. The distance between the center line to the buffer space 21 may be stored in association with each path segment. The buffer space 21 may be defined at a predetermined distance to a node. The distances from the node to the buffer space 21 may be stored in association with each path segment. The server 125 may determine a volume for the drone navigable space based on the drone navigable space defined by the building model created from manual modeling or photogrammetry.

The server 125 may calculate routing paths between an origin and a destination based on the drone navigable space tied to the path segments. The path segments may include drone space attributes that specify a width and/or a height for the drone navigable space. The database 123 may include a starting point for a path segment, and ending point for the path segment, and one or more drone space attributes (e.g., the width or the height for the drone navigable space). The server 125 may receive a request for routing for a drone. The request may be received from the drone (i.e., mobile device 122), from a user operating a workstation 128 or a remote control. The server 125 may calculate a route through the drone space based on the at least one road segment.

In addition or in the alternative to the building model, the drone space may be defined according to boundary line data or cartographical data. Rather than a network of path segments and node, the boundary line data describes locations of objects using two-dimensional or three-dimensional shapes (e.g., edges, vertices, corners, or other geometric features). The boundary line data may describe areas that are outside of the road network such as parks, forests, farms, private property, bodies of water, or other features. The buffer space 21 may be used to stop drones from entering this areas or navigate them through these areas in a specified manner.

Figure 8:
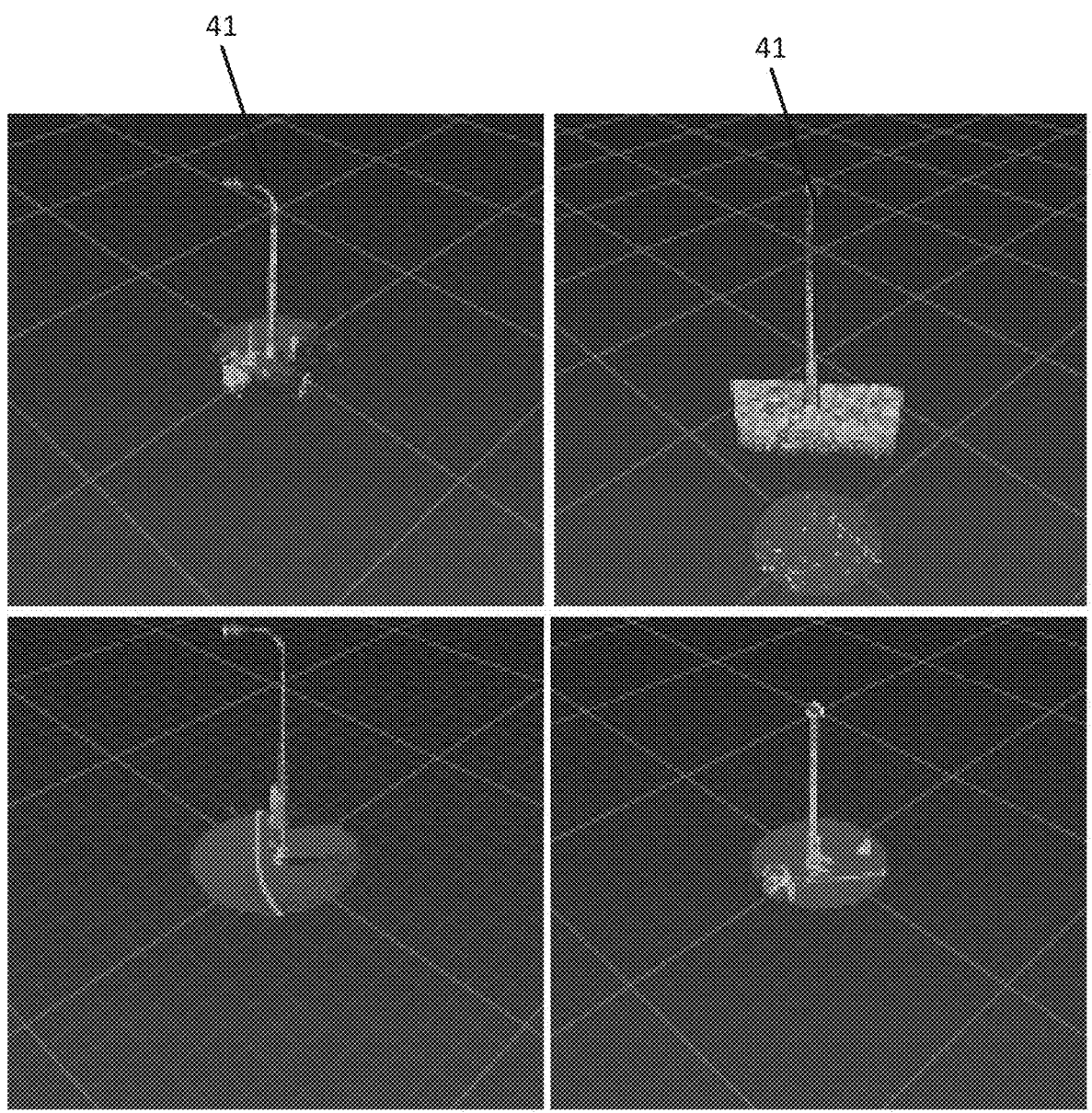
FIG. 8 illustrates an example of point cloud data (for example, data from LiDAR or photogrammetry) defining an obstacle to be avoided by the drone.

FIG. 8 illustrates an example of point cloud data (for example, data from LiDAR or photogrammetry) defining an obstacle to be avoided by the drone. The obstacles may include trees, street lights, street signs, traffic signals, and other road furniture or obstacles. Even without an explicit geometric model of the object, a no-fly buffer can be enforced around the point on the object. This is a useful capability because many features are too small to be include in other data sources (e.g. building models, triangle mesh data from aerial photogrammetry) and too computationally intensive to explicitly model from point clouds. But the objects still need to be included in the airspace map because they are significant obstacles to the drones.

The server 125 may analyze the point cloud data in order to identify obstacles. The server 125 may compare clusters of point data to a threshold to distinguish noise from real obstacles. The threshold may be based on a predetermined number of points, or a predetermined density of points in a particular three-dimensional space. The server 125 may define a buffer space based on the identified obstacles according to any of the examples herein. The server may combine heights based on regulator ceiling restrictions with the buffer space based on the obstacles. The volumetric representation may be embedded in the drone (e.g., stored in an onboard memory of the drone) for flight control to avoid obstructions as well as for collision avoidance in terms of navigable air space.

The mobile device 122 may be a personal navigation device ("PND"), a portable navigation device smart phone, a mobile phone, a personal digital assistant ("PDA"), a car, a tablet computer, a notebook computer, and/or any other known or later developed connected device or personal computer. Non-limiting embodiments of navigation devices may also include relational database service devices, mobile phone devices, or car navigation devices.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

Figure 9:
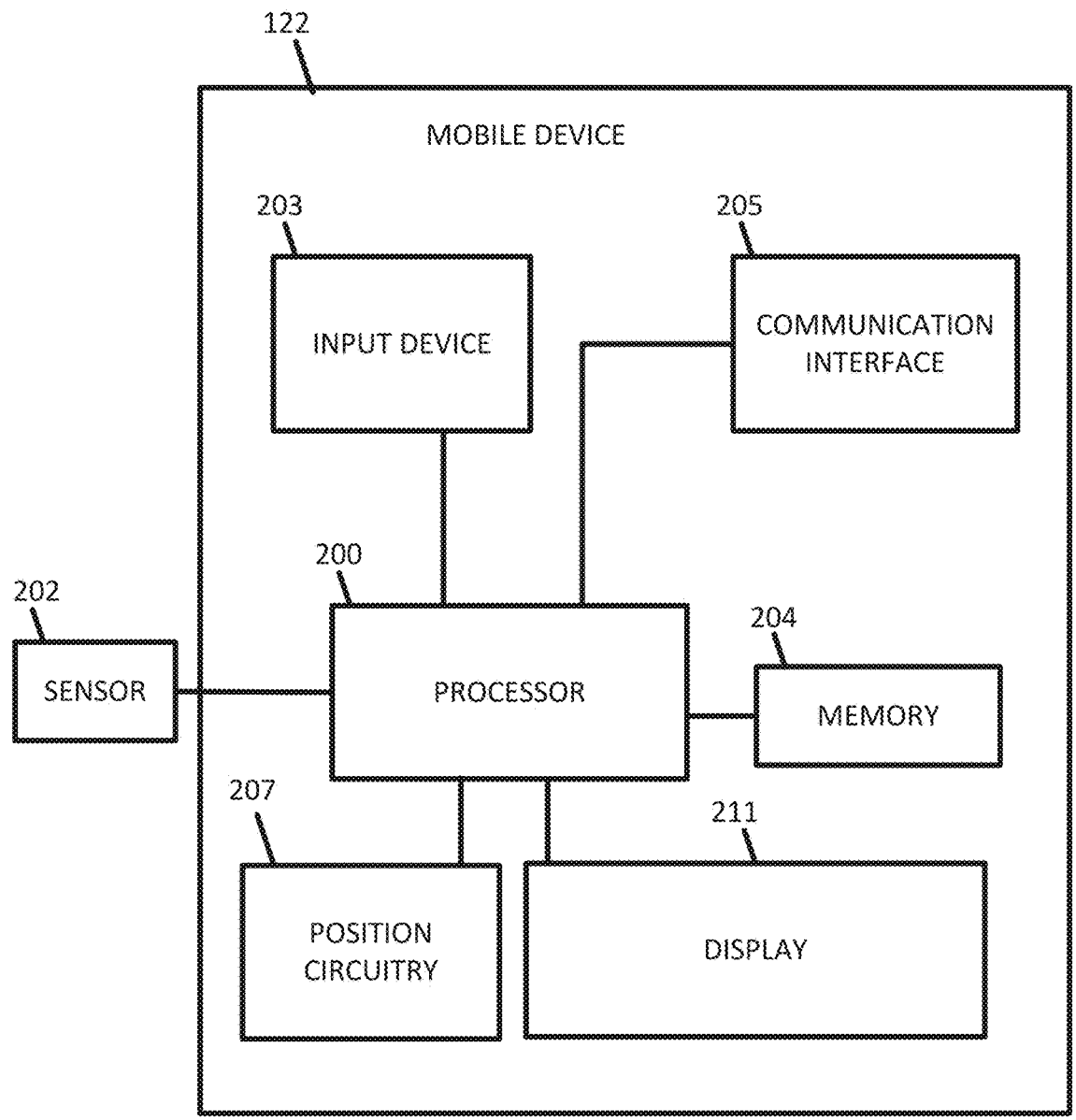
FIG. 9 illustrates an example mobile device of the system for defining the drone navigable space.
Figure 10:
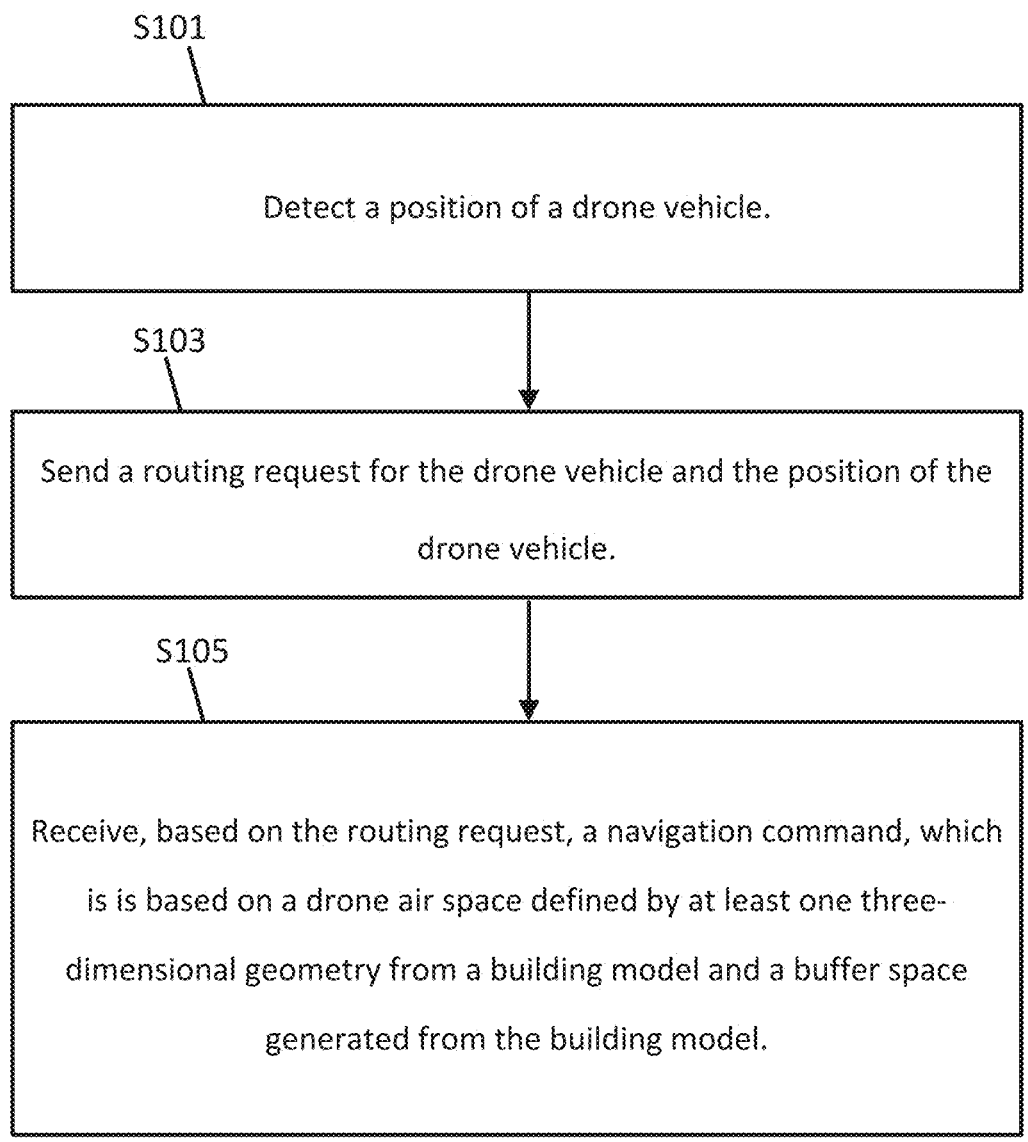
FIG. 10 illustrates an example flowchart for the mobile device of FIG. 9.

FIG. 9 illustrates an exemplary mobile device 122 of the system of FIG. 1. The mobile device 122 includes a processor 200, a memory 204, an input device 203, a communication interface 205, position circuitry 207, a display 211, and a sensor 202. The sensor 202 may be a camera or another type of sensor and may be internal or external to the mobile device 122. Additional, different, or fewer components are possible for the mobile device 122. FIG. 10 illustrates an example flowchart for the operation of the mobile device 122. Additional, different, or fewer acts may be used.

The mobile device 122 (or navigation device 122) is configured to execute routing algorithms to determine an optimum route to travel along a network of navigable path segments from an origin location to a destination location in a geographic region. The navigable path segments may include the drone navigable space above a road network. The navigable paths may also include drone-specific paths that do not correspond to roads. The mobile device 122 may be onboard the drone. The mobile device 122 may be wireless remote controller that controls the drone. The mobile device 122 may communicate with the drone using radio communication (e.g., 900 MHz), the protocols known as Bluetooth, or the protocols known as the 802.11.

Using input from the end user, the navigation device 122 examines potential routes between the origin location and the destination location to determine the optimum route. The navigation device 122 may then provide the end user (e.g., drone pilot) with information about the optimum route in the form of guidance that identifies the maneuvers required to be taken by the end user to travel from the origin to the destination location. Some navigation devices 122 transmit detailed maps to the drone pilot via a wireless control including a display of an outline of the route, the types of maneuvers to be taken at various locations along the route, locations of certain types of features, and so on.

In one example, a three-dimensional or volumetric representation of the drone air space may be presented on the display 211. The processor 200 may generate a computer animation of the drone air space. In another example, the drone may include a camera (e.g., sensor 202) that sends a camera feed of the drone's view to the display 211 to augment the pilots understanding of the flight as well as to preview flights before flying.

At act S101, the processor 200 or the position circuitry 207 detects or receives the position of the drone vehicle. The position may include a longitude value, a latitude value, and a height or altitude value. The position circuitry 207 may also determine an orientation of the drone vehicle such as a heading, roll, pitch, or yaw, which may be measured by angles in degrees, radians, or another scale.

At act S103, the processor 200 or the communication interface 205 may send a routing request for the drone vehicle and the position of the drone vehicle, and at act S105, the processor 200 or the communication interface 205 receives a navigation command based on the routing request. In addition or in the alternative to the navigation command, a warning message may be received by the drone or the remote control that indicates that is near the buffer space or in a no fly zone.

The routing request may include a destination. In this case, the server 125 may process the routing request and send a directional command to fly the drone in a particular direction while avoiding the buffer space. In addition, the server 125 may return a speed command as the navigation command.

In another example, the routing request may include a direction command from the drone (e.g., a command to fly in a particular direction from a remote control). In this case, the server 125 may return the navigation command that either overrules or approves the direction command for the drone. For example, when the drone is attempting to approach the buffer space, the navigation command may overrule the drones intended course of action. When the drone is flying in open drone navigable space, the navigation command may be omitted or may approve the direction command from the drone.

The navigation command is based on a drone air space defined by at least one three-dimensional geometry from a building model and a buffer space generated from the building model as described by other examples herein. The drone air space is defined by at least one path segment associated with the navigation command and coordinates from the buffer space. The buffer space is defined based on a buffer distance from buildings in the building model, and the buffer space is a function of a geographic region, a functional classification of the at least one path segment, a temporal characteristic, or a drone identification value, according to any of the examples herein.

In addition, to width, height, or other dimensional coordinates of the drone navigable space, the path segment data records of the database 123 may be associated with attributes of or about the roads such as, for example, geographic coordinates, street names, address ranges, speed limits, turn restrictions at intersections, and/or other navigation related attributes (e.g., one or more of the road segments is part of a highway or tollway, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The node data records may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data. In addition to the surface road-related attributes, the path segment data records of the database 123 may be associated with analogous navigation-related attributes of the drone navigable space, such as drone speed limits and drone maneuver restrictions as well as locations of drone POI's such as charging stations.

The path segment data records may also include an attribute for functional class, which is accessed by the mobile device 122 or the server 125 for the examples disclosed herein. The functional class of the road segment may be described as a numerical value (e.g., 1, 2, 3, 4, and 5). Functional class 1 may be highways while functional class 5 may be small streets.

One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size. Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

In addition to the functional classification system for the terrestrial roads, the database 123 may also assign functional classification values to the drone path segments. The functional classification values to the drone path segments may define the size of the buffer space, travel speeds of drones permitted, travel heights of drones permitted, or the types of drones permitted along the drone path segments. The functional classification values assigned to the drone path segments may not directly correlate with the functional classification system for terrestrial roads.

Figure 11:
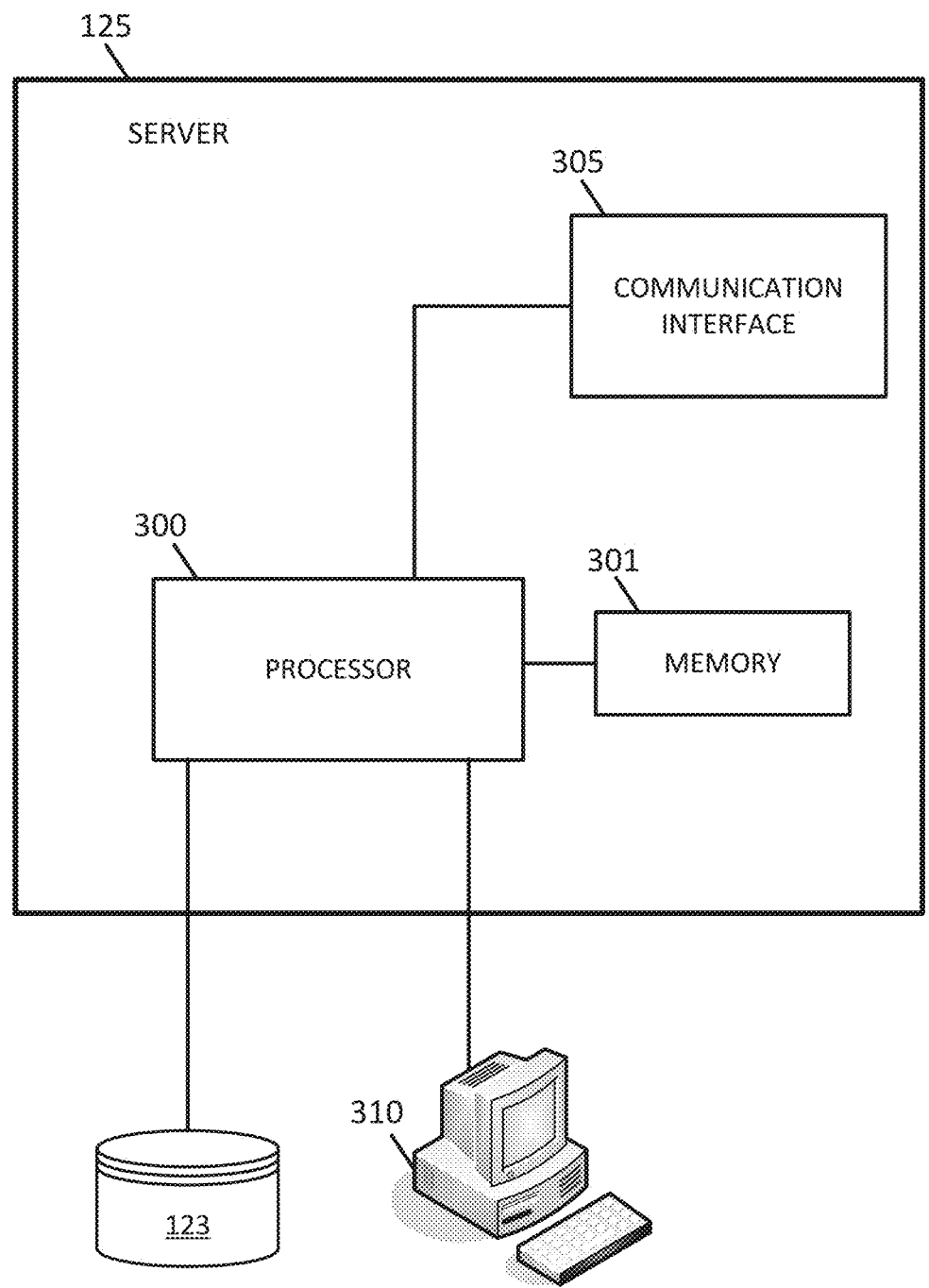
FIG. 11 illustrates an example sever in the system for defining the drone navigable space.

FIG. 11 illustrates an example server 125. The server 125 includes a processor 300, a communication interface 305, and a memory 301. The server 125 may be coupled to a database 123 and a workstation 310. The workstation 310 may be used to enter data regarding the variable size of the buffer space, or the factors that determine the size of the buffer space (e.g., a geographic region, a functional classification of the at least one path segment, a temporal characteristic, or a drone identification value).

Figure 12:
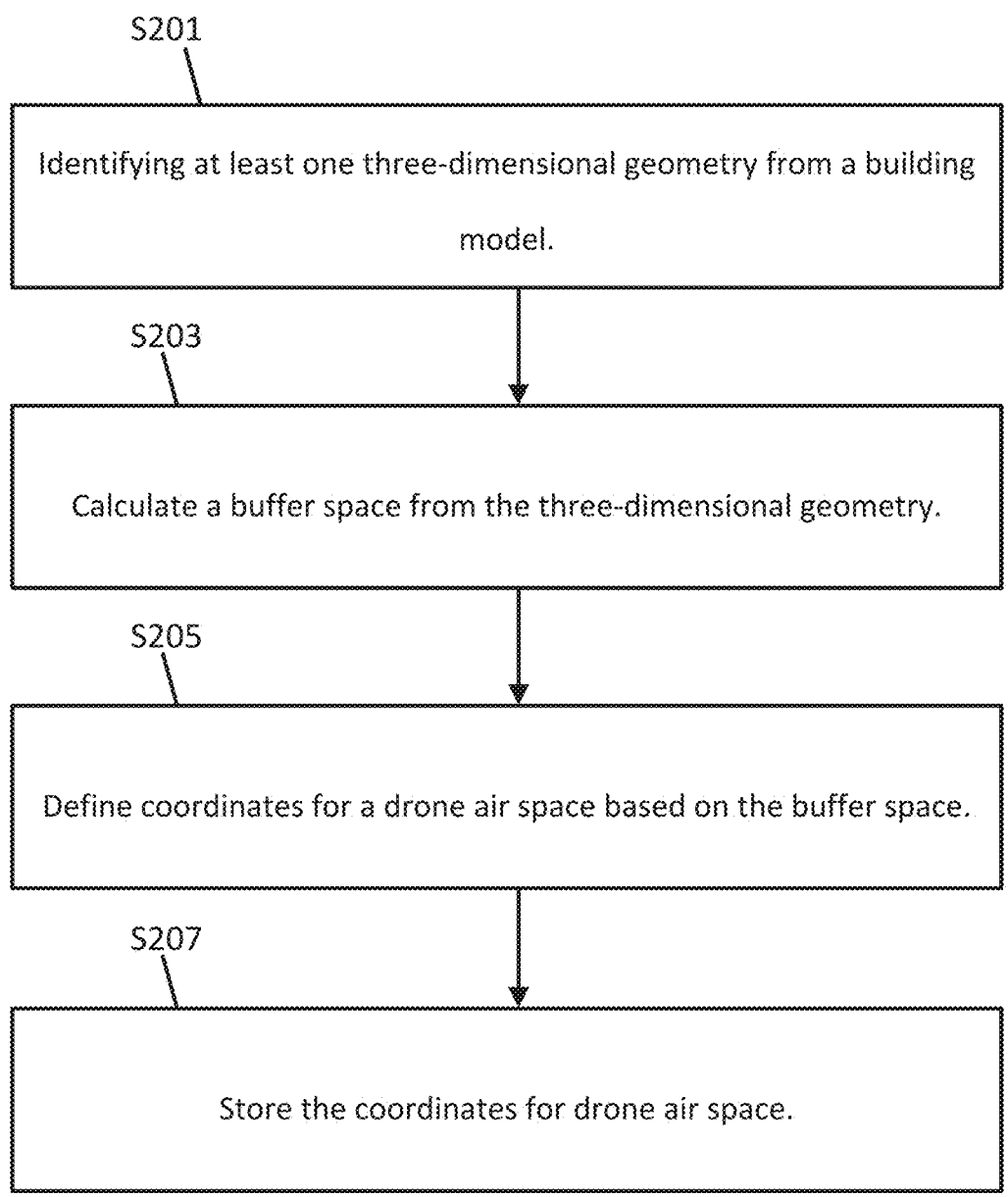
FIG. 12 illustrates an example flowchart for the server of FIG. 11.

FIG. 12 illustrates an example flowchart for the operation of server 125. Additional, different, or fewer acts may be provided.

In act S201, the processor 300 identifies at least one three-dimensional geometry from a building model. The building model may define the two-dimensional or three-dimensional coordinates of buildings or other obstacles.

In act S203, the processor 300 calculates a buffer space from the building model. The buffer space may extend the building model in one or more directions by a predetermined distance. The predetermined distance may vary according to one to many variables. The variables may be static features that vary from place to place include a geographic region, a functional classification of an adjacent roadway, or a time of day. The variables may vary over time such as time of day, traffic, or weather.

In another example, the processor 300 may define the buffer space variable as a function of a drone identification value. The drone identification value may identifier a model of the drone, a flight controller of the drone, or an owner of the drone. The processor 300 determines a degree of error for a drone based on the drone identification value. The degree of error is a function of one or more of a positioning system error, an inertial measurement system error, or a latency time.

In act S205, the processor 300 defines coordinates for a drone air space based on the buffer space. In some examples, the drone air space begins where the buffer space ends and vice versa. In act S207, the processor 300 and the memory 301 stores the coordinates for drone air space. The drone air space may be stored as coordinates in portions that correspond to path segments from the map data in the map database 123.

The databases 123 may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, turn by turn navigation instructions, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The positioning circuitry 207 may include a Global Positioning System (GPS), Global Navigation Satellite System (GLONASS), Galileo, BeiDou or the Indian Regional Navigation Satellite System, or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer or gyroscope built or embedded into or within the interior of the mobile device 122. The accelerometer is operable to detect, recognize, or measure the acceleration of the mobile device 122. The gyroscope is operable to detect, recognize, or measure the rotation rate of the mobile device 122. The mobile device 122 receives location data from the positioning system. The location data indicates the location of the mobile device 122.

The mobile device 122, or only the drone in other embodiments, may also include an environmental sensor to detect the environment of the drone. The environment sensor may include a weather sensor such as a thermometer, barometer, or a rain sensor. In addition, the drone or the mobile device 122 may include sensor 202 or another sensor as an optical sensor such as a LiDAR device, a proximity sensor, or another sensor configured to detect distances to nearby objects or when a nearby object exists. The optical sensor may send a signal that reflects off another object and is detected by the optical sensor. The inertial sensor may include an inertial measurement unit (IMU) including one or more of an accelerometer, a gyroscope, and a magnetic sensor. The inertial sensor may generate data indicative of the acceleration, deceleration, rotational acceleration, and rotational deceleration experienced by the vehicle.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, solid state storage or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks, solid state storage or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for drone routing, the method comprising:
receiving a route request from a drone vehicle, the route request including a position of the drone vehicle;
identifying, using a processor, a parameter for the drone vehicle;
accessing a database for a building model including coordinates based on data from a range finding device;
selecting, in response to the route request and the parameter for the drone vehicle, a lane through a drone space based on the coordinates of the building model;
monitoring drone traffic based on routing requests from a plurality of aerial vehicles;
calculating a size of the lane based on the drone traffic; and
generating, using the processor, a navigation command including the lane through the drone space.

2. The method of claim 1, wherein the drone space is defined from at least one three-dimensional geometry from the building model.

3. The method of claim 1, further comprising:
identifying a buffer space calculated from the coordinates of the building model;
performing a comparison of the position of the drone vehicle to the buffer space; and
generating a warning message in response to the comparison,
wherein the lane through the drone space is selected based on the buffer space calculated from the coordinates of the building model.

4. The method of claim 1, wherein the navigation command overrules a direction command of the drone vehicle.

5. The method of claim 1, wherein the lane is a first drone lane, and the database includes coordinates for the first drone lane coordinates and for a second drone lane.

6. The method of claim 5, wherein the first lane and the second lane are arranged vertically in space.

7. The method of claim 5, wherein the first lane and the second lane are arranged horizontally in space.

8. The method of claim 5, wherein the parameter of the drone vehicle is speed, wherein the first lane corresponds to drone vehicles traveling a first speed and the second lane corresponds to drone vehicles traveling at a second speed.

9. The method of claim 5, wherein the parameter of the drone vehicle is direction, wherein the first lane corresponds to drone vehicles traveling in a first direction and the second lane corresponds to drone vehicles traveling in a second direction.

10. The method of claim 5, wherein the parameter of the drone vehicle is a type of drone, wherein the first lane corresponds to a first type of drone and the second lane corresponds to a second type of drone.

11. The method of claim 1, wherein the parameter of the drone vehicle includes a requested speed for the drone vehicle, the lane for the navigation command selected based on the requested speed.

12. An apparatus for drone routing, the apparatus comprising:
- a communication interface configured to receive a route request from a drone vehicle, the route request including a position of the drone vehicle;
- a database configured to store coordinates for a building model based on data from a range finding device, the coordinates associated with a first drone lane and a second drone lane for a drone navigable air space; and
- a controller configured to access the database, in response to the route request from the drone vehicle, to select the first drone lane or the second drone lane,
- wherein the controller is configured to monitor drone traffic and calculate a size of the first lane or the second lane based on the drone traffic, and wherein the drone traffic is defined based on a plurality of routing requests from multiple drone vehicles.

13. The apparatus of claim 12, wherein the controller is configured to generate a navigation command including the selected first drone lane or second drone lane.

14. An apparatus comprising:
- a model including data collected by at least one sensor of a range finding device configured to collect distance data that describes a plurality of buildings in a point cloud;
- a controller configured to define coordinates for a first drone lane and a second drone lane in air space defined by the model; and
- a geographic database configured to store the coordinates for the first drone lane and the second drone lane for the air space,
- wherein the controller is configured to monitor drone traffic and calculate a size of the first lane or the second lane based on the drone traffic, and wherein the drone traffic is defined based on a plurality of routing requests from multiple drone vehicles.

15. The apparatus of claim 14, wherein the first lane and the second lane are arranged vertically in space or horizontally in space.

16. The apparatus of claim 14, wherein the first lane corresponds to drones traveling a first speed and the second lane corresponds to drones traveling at a second speed or wherein the first lane corresponds to drones traveling in a first direction and the second lane corresponds to drones traveling in a second direction.

17. The method of claim 1, wherein the range finding device is a light detection and ranging (LiDAR) device.

18. The method of claim 17, further comprising:
- generating a point cloud from the data from the range finding device.

* * * * *